United States Patent
Haigh et al.

[11] Patent Number: 5,986,450
[45] Date of Patent: Nov. 16, 1999

[54] DIRECTIONALLY INDEPENDENT MAGNET SENSOR

[75] Inventors: Geoffrey T. Haigh, Boxford; Paul R. Nickson, Topsfield, both of Mass.

[73] Assignee: Analog Devices, Norwood, Mass.

[21] Appl. No.: 08/833,333

[22] Filed: Apr. 4, 1997

[51] Int. Cl.[6] .............................. G01B 7/30; G01R 33/06; H01L 43/06
[52] U.S. Cl. ..................... 324/207.2; 324/251; 338/32 H
[58] Field of Search ................. 324/207.2, 251, 324/207.21, 252; 338/32 H, 32 R; 257/421, 426, 427

[56] References Cited

U.S. PATENT DOCUMENTS

| | | | |
|---|---|---|---|
| 3,375,202 | 8/1973 | Katoka et al. | 338/32 R |
| 4,223,682 | 9/1980 | Sherman | 128/672 |
| 4,293,814 | 10/1981 | Boyer | 324/166 |
| 4,311,960 | 1/1982 | Barr | 324/103 |
| 4,488,164 | 12/1984 | Kazarinov et al. | 357/27 |
| 4,668,914 | 5/1987 | Kersten et al. | 324/251 |
| 4,709,214 | 11/1987 | Higgs | 330/6 |
| 4,737,710 | 4/1988 | Van Antwerp et al. | 324/208 |
| 4,914,387 | 4/1990 | Santos | 324/166 |
| 4,922,197 | 5/1990 | Juds et al. | 324/207.21 |
| 4,970,463 | 11/1990 | Wolf et al. | 324/207.2 |
| 5,144,231 | 9/1992 | Tenenbaum et al. | 324/164 |
| 5,146,258 | 9/1992 | Bell et al. | 354/432 |
| 5,194,750 | 3/1993 | Popovic | 257/225 |
| 5,334,930 | 8/1994 | Onodera et al. | 324/103 P |
| 5,442,283 | 8/1995 | Vig et al. | 324/207 |
| 5,446,375 | 8/1995 | Perkins et al. | 324/163 |
| 5,574,367 | 11/1996 | Logue | 324/207.26 |
| 5,591,996 | 1/1997 | Haigh et al. | 257/238 |
| 5,691,637 | 11/1997 | Oswald et al. | 324/207.2 |

FOREIGN PATENT DOCUMENTS

95/16896  6/1995  WIPO .

OTHER PUBLICATIONS

Allegro Microsystems, Inc., "3046, 3056, and 3058 Hall Effect Gear–Tooth Sensors–Zero Speed," pp. 4–1:4–7 (date unknown).

Primary Examiner—Walter E. Snow
Attorney, Agent, or Firm—Hale and Dorr LLP

[57] ABSTRACT

A magnetic sensor has a first sensing element and a second sensing element surrounding the first sensing element so that the sensor is directionally independent in a plane perpendicular to a sensing axis. The sensor can be mounted in a housing that has an end with a threaded rod or a pin for connection to a support member.

23 Claims, 4 Drawing Sheets

DIRECTIONALLY INDEPENDENT MAGNET SENSOR

BACKGROUND OF THE INVENTION

This invention relates to magnetic sensors, and particularly to magnetic sensors used to sense positional changes in a moving object.

According to the well-known Hall effect, if a current is provided across a conducting or semiconducting plate along a first axis in a plane of the plate and a magnetic field is applied along a second axis perpendicular to the plate, an electric field (and hence a voltage) is induced in the plane of the plate along a third axis that is mutually orthogonal to the first and second axes. The induced voltage is proportional to the sensed magnetic field, and thus the sensor can be used to sense the magnitude of the magnetic field, or it can at least be used to sense when changes occur in the magnitude of the magnetic field.

One known application for a magnetic sensor based on the Hall effect is described, for example, in Wolf, U.S. Pat. No. 4,970,463. Referring to FIG. 1 herein, a magnetic field sensor 10 is positioned between a source 12 of a magnetic field (such as a permanent magnet), and a ferrous object 14, such as a gear with teeth that effectively define larger radius portions 16 and smaller radius portions 18. As object 14 rotates about an axis 20 and the larger and smaller radius portions 16 and 18 pass across sensor 10, the distance between source 12 and the outer boundary of object 14 effectively changes, thereby causing the magnetic field between them and hence the induced voltage to change. Circuitry coupled to the sensor is used to sense such changes that exceed a desired threshold, thereby indicating the occurrence of a transition when an edge of a gear tooth passes the sensor.

Two or more magnetic field sensing elements 22a, 22b can be spaced apart in one sensor so that a difference signal can be taken. Methods for using signals from three and four sensing elements arranged in a straight line are described, for example, in U.S. Pat. No. 4,737,710. With such multiple sensing elements the elements need to be properly aligned relative to the position and rotation of the shaft. Otherwise, a sensing element may not be in position to sense changes in the field.

SUMMARY OF THE INVENTION

The present invention includes a magnetic sensor and a magnetic sensing system that are independent of the direction of movement of an object in a plane that is orthogonal to a sensing axis. In one embodiment, a sensor is arranged so that a first sensing element is centrally located, and a second sensing element surrounds the first sensing element. The sensor can be formed in multiple layers with a smaller first sensing area in one layer over another layer with larger second sensing area; with a continuous outer sensing element arranged as a ring around an inner sensing element; or with an inner sensing element in an arrangement of outer sensing elements packed closely together and surrounding the inner sensing element. The sensing elements may, but need not, be Hall-effect sensors.

The present invention thus allows a sensor to be easily mounted near an object to be sensed. For example, the sensor can be mounted in a housing that has a threaded portion that allows it to be screwed into a support structure near an object to be sensed. The position of the housing can then be fixed with a lock nut. This structure makes the sensor easy to mount and easy to position. Other features and advantages will become apparent from the following detailed description, drawings, and claims.

DETAILED DESCRIPTION

Figure 1:
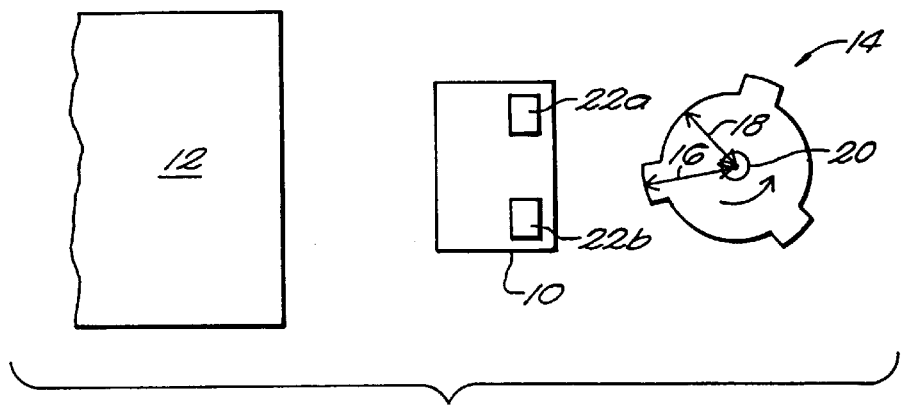
FIG. 1 is a pictorial representation of a known sensing system.
Figure 2:
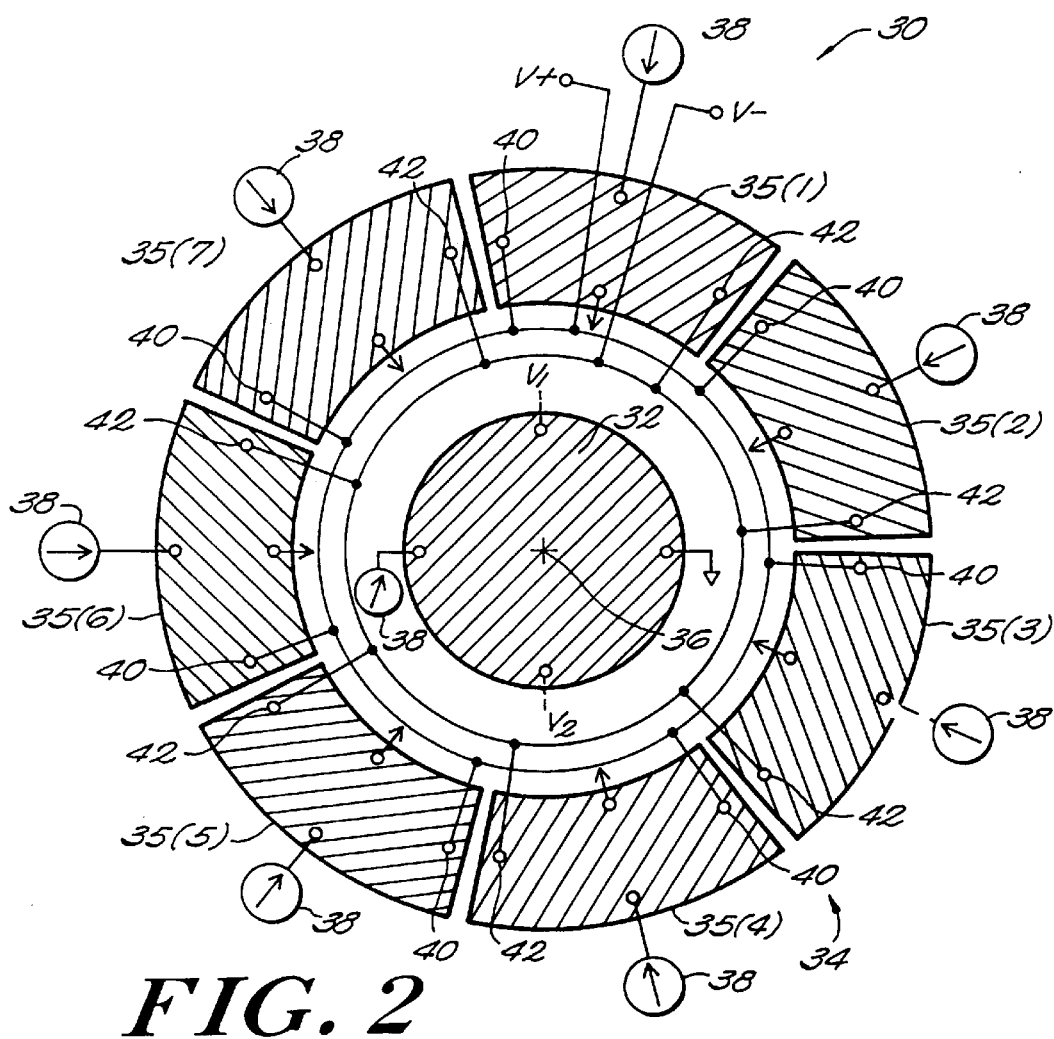
FIG. 2 is a plan view illustrating a first embodiment with an inner sensing element and a number of outer sensing elements electrically coupled together and surrounding the inner sensing element according to a first embodiment of the present invention.

Referring to FIG. 2, a sensor 30 according to the present invention has a circular inner sensing element 32 and seven separate coplanar outer sensing elements 35(1)–35(7), each shaped as a truncated sector. Together, these elements 35(1)–35(7) form a circular ring 34 that surrounds inner sensing element 32. These sensing elements can be formed accurately on a substrate with great precision, e.g., with photolithographic masks and deposition.

Each sensing element has a first contact where the element receives a current from a current source 38, and has a second contact on an opposite side connected to ground. Along a direction perpendicular to a line between the first and second contacts in elements 35(1)–35(7) are two voltage contacts 40 and 42. Each set of contacts is coupled together to sum the signals from all of elements 35(1)–35(7). While the sensing elements are all shown here as Hall-effect sensors, other types of magnetic sensors could be used, such as amorphous magnetoresistors (AMR) or giant magnetoresistors (GMR).

As an object to be sensed passes across sensor 30, the sensor can sense transitions in the position of the object, regardless of the orientation of the sensor about a central sensing axis 36 in the plane of sensing elements 32 and 35(1)–35(7), i.e., independent of the direction of movement of the object in a plane orthogonal to the sensing axis.

Figure 3:
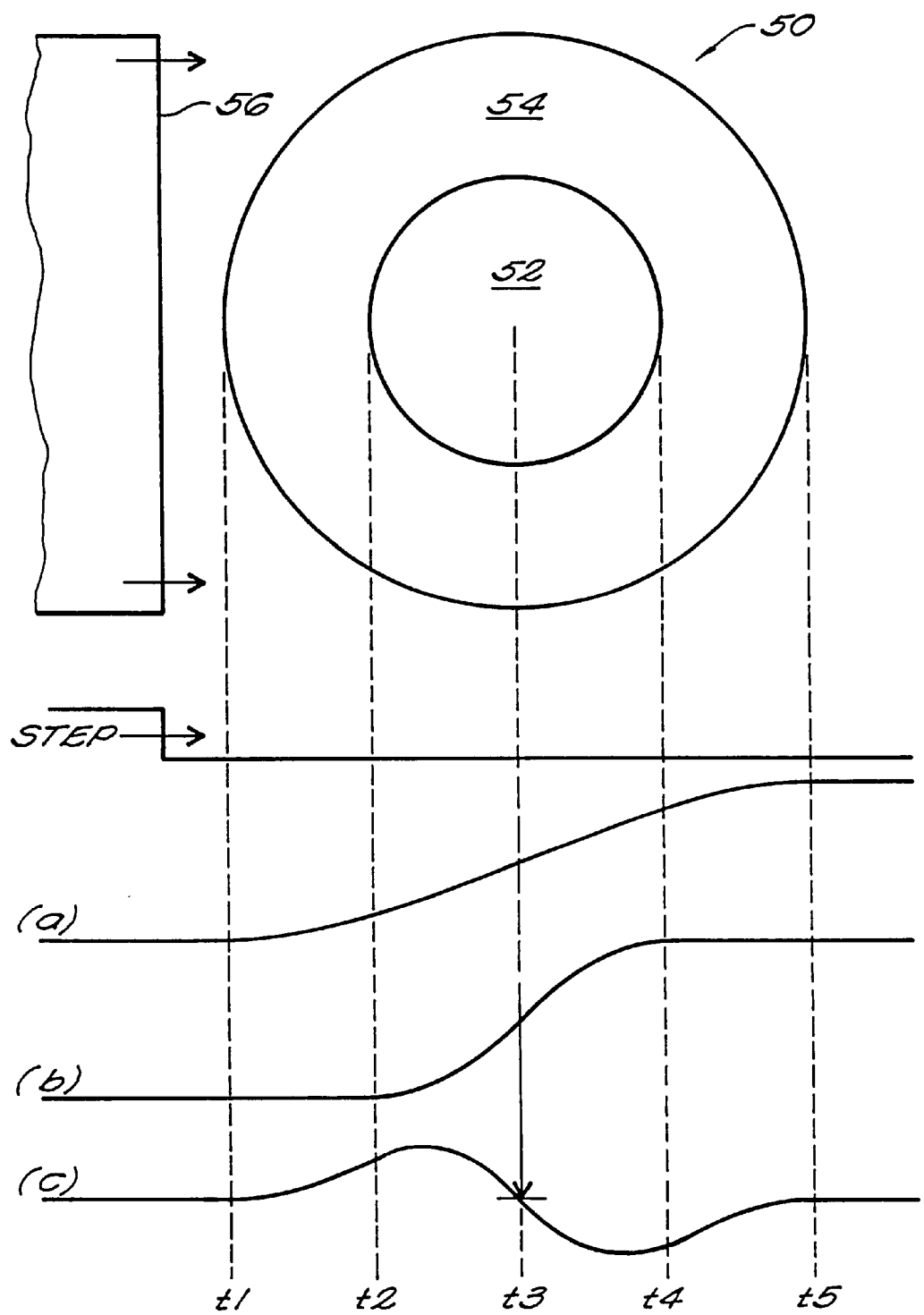
FIG. 3 is a diagram illustrating the sensor, and a timing diagram illustrating a transition moving across the areas.

Referring to FIG. 3, a sensor 50 is illustrated with an inner circular sensing elements 52 and an annular outer sensing element 54, shown here as a continuous ring and abutting element 52 for illustrative purposes. FIG. 3 also includes a timing diagram illustrating output signals represented as (a), (b), and (c) when an object 56, such as a gear tooth, crosses sensing elements 52 and 54. Signals (a) and (b) illustrate the response of sensing elements 54 and 52, respectively. Signal (c), which is a difference of signals (a) and (b), indicates when a transition occurs. The assembly thus has circuity for receiving signals (a) and (b) and for providing signal (c) in response.

As object 50 moves across the two sensing elements, a signal referred to here as STEP also moves across. Signal (a) begins to increase as soon as the transition reaches the outer perimeter of sensing element 54 at time t1, and then ramps to its respective maximum value at time t5 as signal STEP passes over all of sensing element 54 (and assuming that the stepped-up portion of the object is over the entire sensor). As signal STEP reaches sensing element 52, signal (b) begins to increase at time t2 and reaches its maximum value at time t4, where it stays until a next transition in the object. Difference signal (c) begins to rise at time t1, rises until a time between times t2 and t3, and then declines until it reaches a zero crossing at time t3 when STEP is midway across sensing element 52. Sensing elements 52 and 54 and the applied currents are designed and calibrated to have a zero crossing when the step is at the center of sensor 50.

The circuitry thus provides a second spatial derivative of the passage of a spatial change in the magnetic field, with the change being sensed along the sensing axis, independent of the direction of movement of the object over the sensor in a plane orthogonal to the sensing axis.

Figure 4:
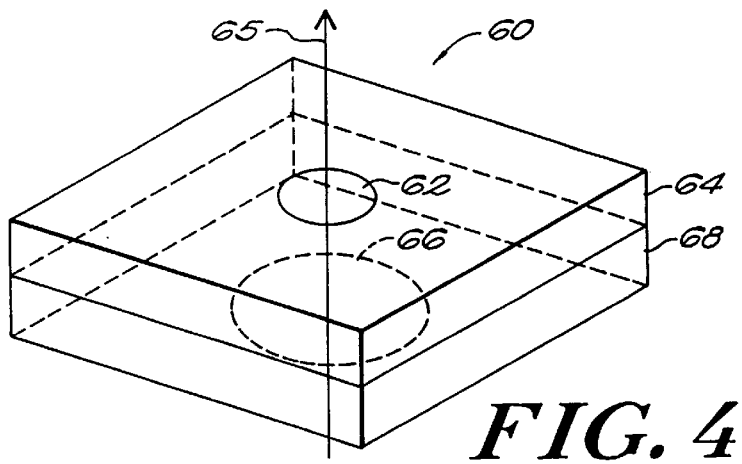
FIG. 4 is a perspective view that illustrates another embodiment of the present invention with inner and outer sensor areas formed in separate layers in one structure.

Referring to FIG. 4, in another embodiment of the present invention, a sensor 60 is formed in two layers, each of which has a sensing element that is preferably circular. In this embodiment, an inner sensor 62 is formed in an upper layer 64 that would typically be closer to the object whose position is being sensed; and an outer sensor 66 is formed in a lower layer 68 and is also preferably circular. The periphery of outer sensor 66 forms a concentric ring with respect to inner sensor 62, but has a diameter that is larger than that of sensor 62. The orientation is thus independent of a rotational position relative to a sensing axis 65.

As an object passes over sensor 60, the object is first sensed only by outer sensor 66, then by both sensors, then only by outer sensor 46 again. The signals are combined appropriately to determine the zero crossing of the second spatial derivative of the spatial change of the magnetic field, caused by the movement of the object passing over the sensor. The zero crossing indicates when the object passes the center of the sensor. While not shown in detail here, these sensors can be Hall-effect sensors with contacts as shown in FIG. 2 for input current, ground, and voltage outputs. While shown as circular, the sensing elements could have other shapes as shown below.

Figure 5:
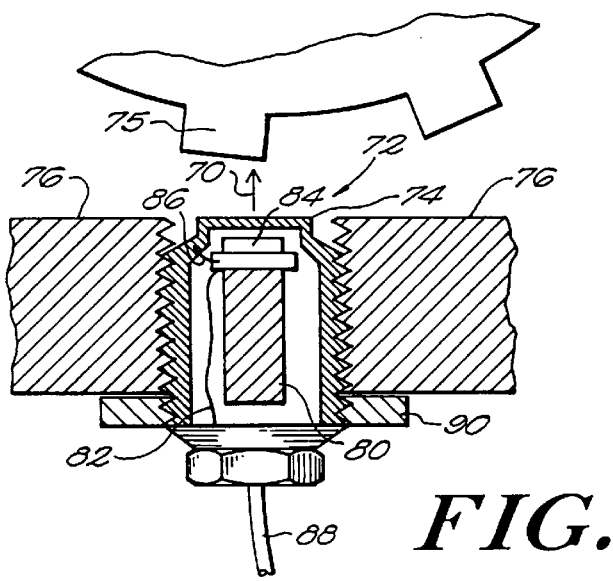
FIG. 5 is a partial cross-sectional view of a sensor and a magnet in a threaded housing housed in a support structure.

Referring to FIG. 5, a sensing unit 72 for sensing the position of an object such as a gear tooth 75 is easy to position because the sensor in the sensing unit need not be oriented in any particular rotational orientation in a plane perpendicular to a sensing axis 70. Sensing unit 70 has a housing 74 with threaded sides that allow it to be screwed into a support structure 76. The sensing unit is simply screwed into support structure 76 until it is in a desired position. The sensing unit can be held in the desired position with a locking nut 90.

Housing 74 of sensing unit 72 encloses a sensor 84, optionally with ancillary circuity; a mounting device 86, such as a plate; and a source 80 of a magnetic field, such as a permanent magnet. One or more leads 82 are provided to extend away from sensor 84 and for connection to a cable 88 to provide a signal from the sensor or from the sensor and the ancillary circuitry.

Figure 6:
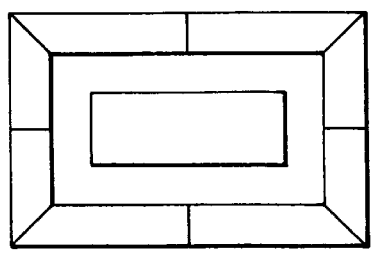
FIGS. 6 and 7 are plan views of sensors according to other embodiments of the present invention.
Figure 7:
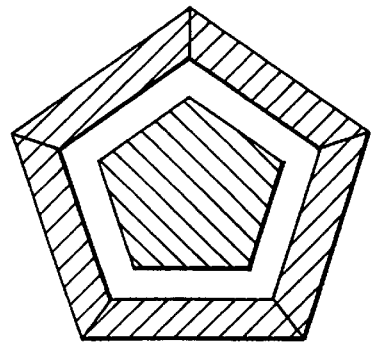

Referring to FIGS. 6 and 7, while the inner and outer sensing elements are shown as a circular element and a circular ring, respectively, the elements could have other shapes, such as a polygon and a polygonal annulus, e.g., a square and a square ring as shown in FIG. 6, or a pentagon with a pentagonal ring as shown in FIG. 7. An odd number of sectors is preferable, however, to prevent the occurrence of a space in which the sensed signal is unchanged. In these embodiments, the sensor need not be oriented in a plane orthogonal to the sensing axis.

In one embodiment, the outer element has an outer diameter in the range of 400 to 800 microns, while the inner element has a diameter of 200 to 400 microns.

Figure 8:
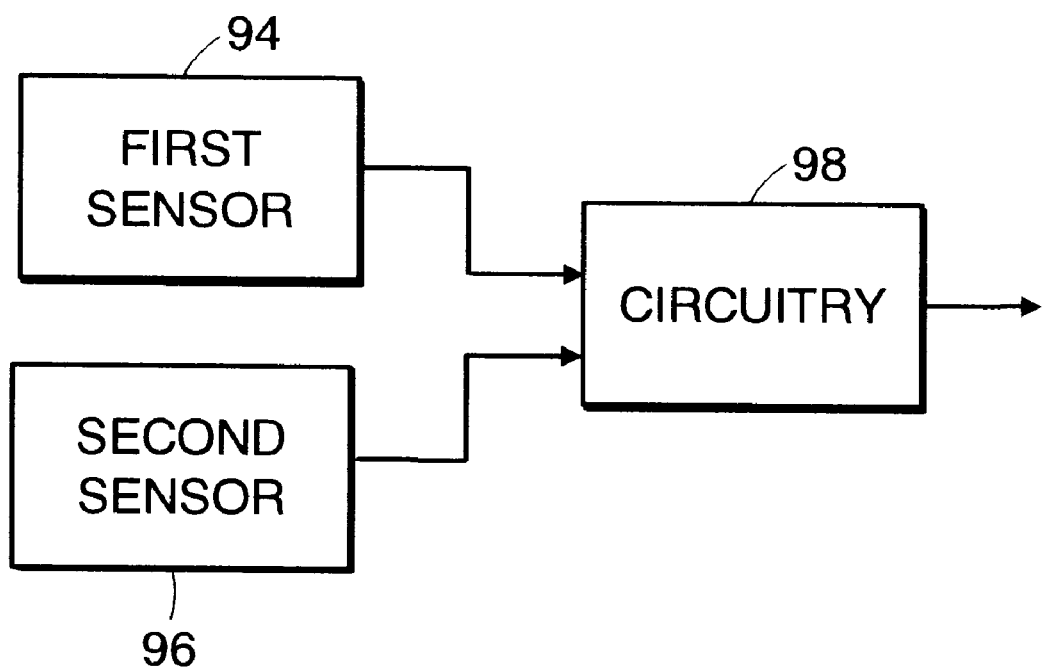
FIG. 8 is a block diagram illustrating sensors and circuitry for sensing according to the present invention.

FIG. 8 shows the sensors and circuitry in a generalized block diagram form. As described above, including in conjunction with FIG. 3, a first sensor 94 and a second sensor 96 provides signals to circuitry 98. The circuitry takes a difference between the first and second signals to provide a second spatial derivative of the passage of a spatial change in the magnetic field as shown in the wave forms in FIG. 3.

Having described preferred embodiments of the present invention, it should be apparent that other modifications can be made without departing from the scope of the invention as set forth in the appended claims. While the inner and outer sensors have been shown with the same type of perimeter, other arrangements could be used; e.g., a square inner sensor could be surrounded by a circular annular group of outer sensors.

What is claimed is:

1. A magnetic sensing assembly comprising:

a first sensor for sensing a magnetic field along a sensing axis and providing a first output signal;

a second sensor for sensing a magnetic field along a sensing axis and providing a second output signal, the second sensor near the first sensor and surrounding the first sensor; and circuitry for taking a difference between the first and second output signals to produce a difference signal that changes as the second spatial derivative of the passage of a spatial change of a magnetic field, wherein the first and second sensors are arranged such that the difference signal in response to linear movement of an object is substantially the same, regardless of a rotational orientation of the first and second sensors in a plane perpendicular to the sensing axis.

2. The sensing assembly of claim 1, wherein the first sensor is circular and the second sensor is in the shape of a circular ring coaxial with the first sensor.

3. A magnetic sensing assembly comprising:

a first sensor in the shape of a regular polygon for sensing a magnetic field; and a second sensor in the shape of a polygonal ring for sensing a magnetic field, the second sensor surrounding the first sensor such that the sensing assembly can similarly sense the movement of an object regardless of a rotational orientation of the sensing assembly.

4. The sensing assembly of claim 1, wherein the second sensor includes a number of separate sensing elements electrically connected together.

5. The sensing assembly of claim 1, wherein the first and second sensors are Hall-effect sensors.

6. A magnetic sensing assembly comprising:

a first sensor formed in a first layer of material for sensing a magnetic field; and a second sensor formed in a second layer of material for sensing a magnetic field, the second sensor near the first sensor and surrounding the first sensor such that the sensing assembly can sense the movement of an object regardless of a rotational orientation of the sensing assembly wherein the first and second layers abut each other.

7. A magnetic sensing assembly comprising:

a first sensor for sensing a magnetic field;

a second sensor for sensing a magnetic field, the second sensor near the first sensor and surrounding the first sensor such that the sensing assembly can sense an object regardless of a rotational orientation of the sensing assembly in one plane, a source of a magnetic field; and a housing for supporting the source and the sensor.

8. The sensing assembly of claim 7 further comprising a support structure, wherein the housing has a threaded portion, wherein the housing is rotatably movable with respect to the support structure.

9. A magnetic sensor for sensing linear movement of an object by sensing a magnetic field along a sensitive axis, the sensor having at least two sensing elements for providing respective first and second output signals indicating changes in the object as it moves linearly, and circuitry for taking a difference between the first and second output sensors to produce a difference signal that changes as the second spatial derivative of the passage of a spatial change of a magnetic field the sensing elements arranged so that the sensing is independent of a direction of movement by the object in a plane perpendicular to the sensitive axis.

10. The sensing assembly of claim 2, wherein the second sensor includes a number of separate sensing elements electrically connected together.

11. The sensing assembly of claim 3, wherein the first and second sensors provide respective first and second output signals, the assembly further comprising circuitry for taking a difference between the first and second output sensors to produce a difference signal that changes as the second spatial derivative of the passage of a spatial change of a magnetic field.

12. The sensing assembly of claim 6, wherein the first and second layers are parallel.

13. The sensing assembly of claim 6, wherein the first and second sensors are parallel and coaxial.

14. The sensing assembly of claim 6, wherein the first and second sensors provide respective first and second output signals, the assembly further comprising circuitry for taking a difference between the first and second output sensors to produce a difference signal that changes as the second spatial derivative of the passage of a spatial change of a magnetic field.

15. The sensing assembly of claim 7, wherein the first and second sensors provide respective first and second output signals, the assembly further comprising circuitry for taking a difference between the first and second output sensors to produce a difference signal that changes as the second spatial derivative of the passage of a spatial change of a magnetic field.

16. A magnetic sensing assembly comprising: at least two sensing elements for sensing a magnetic field along a sensitive axis and arranged so that the signal sensed by the sensing elements is substantially the same regardless of a rotational orientation of the sensors in a plane perpendicular to the sensitive axis; and means for mounting the sensor in a support structure so that the sensor is rotated relative to the support structure when mounted, wherein the first and second sensing elements provide respective first and second output signals, the assembly further comprising circuitry for taking a difference between the first and second output sensors to produce a difference signal that changes as the second spatial derivative of the passage of a spatial change of a magnetic field.

17. A magnetic sensing system comprising:

a rotated object having a greater diameter portion and a lesser diameter portion defining a transition therebetween;

a first sensor for sensing a change in a magnetic field when the transition passes across the first sensor along a sensitive axis; and a second sensor for sensing a change in a magnetic field when the transition passes across the second sensor along the sensitive axis, the second sensor surrounding the first sensor;

wherein the first and second sensors are arranged such that the movement of the object is sensed in substantially the same manner regardless of a rotational orientation of the first and second sensors in a plane perpendicular to the sensitive axis.

18. The system of claim 17, further comprising a source of a magnetic field and a housing enclosing the source and first and second sensors.

19. The sensing assembly of claim 17, wherein the first and second sensors provide respective first and second output signals, the assembly further comprising circuitry for taking a difference between the first and second output sensors to produce a difference signal that changes as the second spatial derivative of the passage of a spatial change of a magnetic field.

20. The sensing assembly of claim 17, further comprising a source of a magnetic field and a housing enclosing the source and first and second sensors to form a sensing unit.

21. The sensing assembly of claim 20, wherein the first and second sensors provide respective first and second output signals, the assembly further comprising circuitry for taking a difference between the first and second output sensors to produce a difference signal that changes as the second spatial derivative of the passage of a spatial change of a magnetic field.

22. The sensing assembly of claim 3, wherein the second sensor includes a number of separate sensing elements electrically connected together.

23. The sensing assembly of claim 13, wherein the first and second sensors provide respective first and second output signals, the assembly further comprising circuitry for taking a difference between the first and second output sensors to produce a difference signal that changes as the second spatial derivative of the passage of a spatial change of a magnetic field.

* * * * *